United States Patent [19]
Sumiya

[11] Patent Number: 6,071,841
[45] Date of Patent: Jun. 6, 2000

[54] CUBIC BORON NITRIDE SINTERED BODY AND METHOD OF PREPARING THE SAME

[75] Inventor: Hitoshi Sumiya, Hyogo, Japan

[73] Assignee: Sumitomo Electric Industries, Ltd., Osaka, Japan

[21] Appl. No.: 08/979,988

[22] Filed: Nov. 26, 1997

[30] Foreign Application Priority Data

Nov. 28, 1996 [JP] Japan ..................... 8-317699

[51] Int. Cl.⁷ .......................... C01B 21/064; C04B 35/58
[52] U.S. Cl. ........................................... 501/96.4; 423/290
[58] Field of Search ............................. 423/290; 501/96.4

[56] References Cited

U.S. PATENT DOCUMENTS

| | | | |
|---|---|---|---|
| 3,212,852 | 10/1965 | Bundy | 423/290 |
| 3,473,894 | 10/1969 | Babl et al. | 423/290 |
| 3,577,245 | 5/1971 | Quandt | 501/96.4 |
| 4,188,194 | 2/1980 | Corrigan . | |
| 4,562,050 | 12/1985 | Koeda et al. | 423/290 |
| 4,784,978 | 11/1988 | Ogasawara et al. | 423/290 |
| 4,800,183 | 1/1989 | Quinby | 423/290 |
| 5,618,509 | 4/1997 | Shioi et al. | 423/290 |

FOREIGN PATENT DOCUMENTS

| | | |
|---|---|---|
| 47-34099 | 11/1972 | Japan . |
| 49-38910 | 4/1974 | Japan . |
| 49-27518 | 7/1974 | Japan . |
| 54-33510 | 3/1979 | Japan . |
| 55-167110 | 12/1980 | Japan . |
| 62-091409 | 4/1987 | Japan . |
| 62-176959 | 8/1987 | Japan . |
| 63-394 | 1/1988 | Japan . |
| 03159964 | 7/1991 | Japan . |
| 08047801 | 2/1996 | Japan . |

*Primary Examiner*—Wayne Langel
*Attorney, Agent, or Firm*—W. F. Fasse; W. G. Fasse

[57] ABSTRACT

A cubic boron nitride sintered body has sufficient strength, hardness, heat resistance and heat dissipativity for serving as a cutting tool. A method of preparing a cubic boron nitride sintered body involves preparing a low-pressure phase boron nitride as a starting material by reducing a compound containing boron and oxygen with a compound containing nitrogen and carbon. Then, the low-pressure phase boron nitride starting material is directly converted to a cubic boron nitride sintered body by subjecting the starting material to a high temperature and a high pressure. In the obtained cubic boron nitride sintered body, the ratio $I_{220}/I_{111}$ of X-ray diffraction intensity $I_{220}$ on the (220) plane relative to X-ray diffraction intensity $I_{111}$ on the (111) plane is at least 0.1.

27 Claims, No Drawings

CUBIC BORON NITRIDE SINTERED BODY AND METHOD OF PREPARING THE SAME

BACKGROUND OF THE INVENTION

1. Field of the Invention

The present invention relates to a cubic boron nitride sintered body and a method of preparing the same, and more particularly, it relates to a cubic boron nitride sintered body obtained by directly converting low-pressure phase boron nitride and simultaneously sintering the same, and a method of preparing such a cubic boron nitride sintered body.

2. Description of the Background Art

A sintered body of cubic boron nitride (hereinafter referred to as cBN), which has the next highest hardness after that of diamond and does not react with any ferrous material, is generally applied to a cutting tool for a ferrous material.

Such a sintered body of cBN applied to a cutting tool is generally prepared by sintering cBN powder with a binder consisting of TiN, TiC, Co or the like under a superhigh pressure. The cBN sintered body obtained in this manner contains about 10 to 40 percent by volume of impurity. This impurity is TiN, TiC, Co or the like forming the binder. This impurity causes reduction of strength, heat resistance and heat dissipativity of the cBN sintered body. Particularly in case of cutting a ferrous material with such a cutting tool at a high speed, its cutting edge is readily chipped or cracked to reduce the life of the cutting tool.

A method of preparing a cBN sintered body without a binder is known for solving this problem. This method is adapted to react and sinter a raw material of hexagonal boron nitride (hereinafter referred to as hBN) with a catalyst such as magnesium boronitride, for preparing a cBN sintered body. The sintered body obtained in this manner has high heat conductivity of 6 to 7 W/cm·° C. since the amount of impurity contained therein is small and cBN grains are strongly bonded to each other therein. Therefore, this sintered body is applied to a heat sink material or a TAB (tape automated bonding) tool. However, the catalyst such as magnesium boronitride remains in this sinteread body. When heated, therefore, fine cracks are readily caused in the cBN sintered body due to thermal expansion difference between the catalyst and cBN. Therefore, this sintered body, having a low heat-resistance temperature of about 700° C., cannot be applied to a cutting tool. Further, the sintered body are formed by large cBN grains of about 10 $\mu$M in diameter, and hence its strength is reduced although the stlme has a high heat transfer coefficient. When this sintered body is applied to a cutting edge of a cutting tool, therefore, it is difficult to intermittently cut a workpiece with a high load.

On the other hand, a method of directly converting hBN to a cBN sintered body under a superhigh temperature and a suparhigh pressure with no binder or catalyst is also known. For example, each of Japanese Patent Laying-Open Nos. 47-34099 (1972) and 3-159964 (1991) discloses a method of keeping hBN at a pressure of 7 GPa and a temperature of at least 2100° C. for obtaining a cBN sintered body. In case of industrial production, however, this method is disadvantageous in cost or productivity. In this method, further, large cBN crystals are readily grown due to the sintering under a high temperature, Thus, the strength of the sintered body is so reduced that its cutting edge is chipped when applied to a cutting tool. Further, hBN employed in this method is readily oriented in the <111> direction, and hence the cBN sintered body prepared from thin material is also readily oriented in the <111> direction. When the cBN sintered body obtained by this method is applied to a cutting tool, therefore, layer cracking or separation la diaadvantageously caused.

On the other hand, each of Japanese Patent Laying-Open Nos. 54-33510 (1979) and 8-47801 (1996) discloses a method of preparing a cBN sintered body from pyrolytic boron nitride (hereinafter referred to as pBN) with no binder or catalyst. However, this method is disadvantageous in cost or productivity in case of industrial production. In this method, further, pBN employed as the raw material has an extremely high cost, compressed hBN readily remains in the cBN sintered body, and layer cracking or separation is readily caused due to strong orientation of the cBN sintered body.

Japanese Patent Publication No. 49-27518 (1974) discloses a method of preparing a cBN sintered body with no binder or catalyst under a lower temperature condition by employing hexagonal boron nitride having a mean grain diameter of not more than 3 $\mu$m and keeping this raw material at a pressure of 6 GPa and a temperature of 1100° C. In this method, however, the raw material of hexagonal boron nitride consists of fine powder and contains several percent of a boron oxide impurity or adsorbed gas. Thus, sintering insufficiently progresses due to action of the impurity or adsorbed gas. Further, the cBN sintered body containing an oxide of boron is so reduced in hardness, strength and heat resistance that the same cannot be applied to a cutting tool.

SUMMARY OF THE INVENTION

Accordingly, the present invention has been proposed in order to solve the aforementioned problems, and an object thereof is to provide a cBN sintered body having sufficient strength, hardness, temperature resistance and heat dissipativity for serving as a cutting tool, and to provide a method of preparing the same.

The method of preparing a cubic boron nitride sintered body according to the present invention comprises the stops of preparing low-pressure phase boron nitride serving as a starting material by reducing a compound containing boron and oxygen with a compound containing carbon and nitrogen, and directly converting the low-pressure phase boron nitride to cubic boron nitride under a high temperature and a high pressure and simultaneously sintering the same for obtaining a cubic boron nitride sintered body.

The low-pressure phase boron nitride (low-pressure phase BN) is boron nitride which is thermodynamically stable in a low pressure region, and includes hexagonal BN (hBN), rhombohedral SN (rBN), turbostratic BN (tBN) and amorphous BN (aBN). On the other hand, cBN, which is stable under a high pressure, is also called high-pressure phase BN.

The feature of this method resides in that the low-pressure phase boron nitride serving as the starting material is hardly oriented and the diameter of crystal grains is not increased following a heat treatment under a high temperature. Therefore, the cBN sintered body obtained by directly converting the low-pressure phase boron nitride under a high temperature and a high pressure is hardly oriented, i.e., it is isotropic, and has a small diameter of crystal grains. Consequently, a cBN sintered body having sufficient strength and hardness for serving as a cutting tool can be obtained.

The direct conversion to cubic boron nitride is preferably performed after heating the low-pressure phase boron nitride in a non-oxidative atmosphere at a temperature of the boiling point of the compound or at a temperature exceeding the boiling point of the compound containing boron and oxygen. In this case, the compound containing boron and oxygen or adsorbed gas is volatilized by heating, so that it does not remain in the low-pressure phase boron nitride. Therefore, bonding strength between cBN grains is so increased that a cBN sintered body which is excellent not only in strength and hardness also in temperature resistance and heat dissipativity for serving as a cutting tool can be obtained. Further, the compound containing boron and oxygen which inhibits the conversion to cBN is so volatilized that the low-pressure phase boron nitride is readily converted to cBN. Thus, no hBN remains in the cBN sintered body, dissimilarly to the case of the conventional direct conversion method. Consequently, a cBN sintered body having high strength can be obtained under mild temperature and pressure conditions.

The low-pressure phase boron nitride preferably contains 0.08 to 1 percent by weight of oxygen. The oxygen content is set to be at least 0.08 percent by weight since the low-crystalline low-pressure phase BN according to the present invention contains less than 0.08 percent by weight of unremovable oxygen. The oxygen content is set to be not more than 1 percent by weight since low-pressure phase boron nitride containing oxygen in excess of 1 percent by weight is so hardly converted to cBN that unconverted low-pressure phase BN remains in the cBN sintered body and thus reduces its strength and hardness if such low-pressure phase BN is employed as the starting material.

The direct conversion to the cubic boron nitride is preferably performed after a heating powder of the low-pressure phase boron nitride in a non-oxidative atmosphere and thereafter forming the same to obtain a compact, and further heating this compact. In this case, adsorbed gas contained in the compact is removed due to the heating. Therefore, the bonding strength between the cBN grains is increased, to further improve the strength, hardness, temperature resistance and heat dissipativity of cBN.

The cubic boron nitride sintered body according to the present invention is obtained by directly converting low-pressure phase boron nitride under a high temperature and a high pressure and simultaneously sintering the same. This cubic boron nitride sintered body is isotropic since the ratio $I_{220}/I_{111}$ of X-ray diffraction intensity $I_{220}$ on its (220) plane relative to X-ray diffraction intensity $I_{111}$ on the (111) plane is relatively large, whereby a cBN sintered body which is excellent in strength, hardness, heat resistance and heat dissipativity can be obtained. If the ratio $I_{220}/I_{111}$ is less than 0.1, the cBN sintered body can be regarded as being strongly oriented in the <111> direction. Namely, the cBN sintered body is anisotropic in this case, and readily causes layer cracking or separation.

The grain diameter of cubic boron nitride crystals contained in the cubic boron nitride sintered body is preferably not more than 1 $\mu$m. In this case, the strength of the cBN sintered body can be further increased due to the small diameter of the cBN crystals. If the grain diameter of the cubic boron nitride crystals exceeds 1 $\mu$m, transgranular fractures are so readily caused that the strength of the cBN sintered body is reduced.

The hardness of the cubic boron nitride sintered body is preferably at least 4500 kg/mm$^2$.

The cubic boron nitride sintered body preferably has a heat-resistance temperature of at least 1200° C. in a non-oxidative atmosphere.

The foregoing and other objects, features, aspects and advantages of the present invention will become more apparent from the following detailed description of the present invention when taken in conjunction with the accompanying drawing.

BRIEF DESCRIPTION OF THE DRAWING

FIG. 1 is an X-ray diffraction diagram of hBN serving as the raw material for the preparing inventive cBN sintered body.

DESCRIPTION OF THE PREFERRED EMBODIMENTS

EXAMPLE 1

Boron oxide ($B_2O_3$) and melamine ($C_3N_6H_6$) were blended in a mole ratio of 3:1, and homogeneously mixed with each other in a mortar. This mixture was introduced into a tube furnace and heat-treated at a temperature of 950° C. for two hours in nitrogen gas, to obtain a powder. This powder was washed with ethanol, to remove unreacted $B_2O_3$. Further, this powder was heat-treated in a high-frequency furnace at a temperature of 2100° C. for two hours in nitrogen gas, to obtain a powder of boron nitride. The oxygen content in this boron nitride powder measured by gas analysis was 0.66 percent by weight. The crystal structure of the boron nitride powder was investigated by X-ray diffraction. The X-ray source was prepared a CuK α-ray source. The wavelength of the X-ray was 1.54 Å. FIG. 1 shows a diffraction pattern obtained by this X-ray diffraction.

It is understood from FIG. 1 that no diffraction line or peak was obtained from the (102) plane of hBN but a diffraction line corresponding to the (002) plane of hBN was extremely broad, and crystals were isotropically grown. Further, the half band width (W in FIG. 1, unit: degree) of the diffraction line corresponding to the (002) plane of hBN was obtained. The half band width w was substituted in the following equation (A), to Obtain a radian half band width BM:

$$BM = \frac{\pi}{180} \times W \qquad (A)$$

The radian half band width SM and a mechanical error BS (=4.0×10$^{-3}$) were substituted in the following equation (B), to obtain a true half band width B:

$$B = \sqrt{(BM)^2 - (BS)^2} \qquad (B)$$

From the true halt band width B, the wavelength ($\lambda$=1.54 Å) and the angle (half the value A in FIG. 1) causing the diffraction on the (002) plane, the diameter t of the crystal grains was calculated according to the following equation (C):

$$t = \frac{0.9\lambda}{B\cos\theta} \qquad (C)$$

The diameter t of the crystal grains calculated through the above equation was 13 nm.

The powder of low-pressure phase BN synthesized in the aforementioned procedure was pressed or embossed under a pressure of 6×10$^3$ kgf/cm$^2$, for preparing a compact of 8 mm in diameter and 3 mm in thickness. This compact was heat-treated in a high-frequency furnace at a temperature of 2100° C. for two hours in nitrogen gas. Then, the compact was introduced into a capsule consisting of molybdenum (Mo), and kept at a pressure of 6.5 GPa and a temperature of 1850° C. for 15 minutes in a belted type superhigh pressure generator, for thereby obtaining a cBN sintered body.

The structure of this sintered body was investigated by X-ray diffraction, to recognize that the same consisted of only cBN. In this X-ray diffraction, the ratio $I_{220}/I_{111}$ of diffraction intensity $I_{220}$ on the (220) plane of cBN relative to diffraction intensity $I_{111}$ on the (111) plane of cBN was 0.18. Thus, it was recognized that the cBN sintered body was an isotropic sintered body having a small orientation property. Further, the fine structure of this cBN sintered body was observed with a transmisison electron microscope, to recognize that the diameter of the caN crystal grains was about 0.5 μm and the sintered body consisted of fine crystals. It was also recognized through this observation that no impurity was present between the crystal grains, which were strongly bonded to each other, The hardness of the cBN sintered body was measured with a micro-Knoop indenter, to recognize that the same had high hardness of 5500 kg/mm². Further, heat conductivity was measured by a laser flash method, to recognize that the cBN sintered body had high heat conductivity of about 6 W/cm·° C. In addition, temperature resistance was evaluated by comparing the hardness before a heat treatment in a vacuum furnace with the hardness after the heat treatment, to recognize that the cBN sintered body was stable up to a temperature of 1350° C. and had high temperature resistance. A cutting tool was prepared from the cBN sintered body obtained in the present invention, and subjected to an intermittent high-speed cutting test for cutting cast iron. Further, a commercially available cutting tool consisting of a cBN sintered body prepared with a binder of Co was also subjected to an intermittent high-speed cutting test for cast iron. As a result, it was recognized that the life of the cutting tool prepared from the inventive cBN sintered body was 10 times that of the commercially available cutting tool.

EXAMPLE 2

While the mixture of boron oxide and melamine was heat-treated in the tube furnace at the temperature of 950° C. for two hours in nitrogen gas in Example 1, a mixture of boron oxide and melamine was heat-treated in a tube furnace at a temperature of 850° C. for two hours in nitrogen gas in Example 2. The remaining steps were similar to those of Example 1. The oxygen content of a low-pressure phase BN powder obtained in this manner, measured by gas analysis, was 0.8 percent by weight. When the structure of the low-pressure phase BN powder was investigated by X-ray diffraction, no diffraction line or peak was obtained from the (102) plane of hBN but a diffraction line corresponding to the (002) plane of hBN was extremely broad in the X-ray diffraction diagram, and hence it was recognized that the diameter of low-pressure phase BN crystal grains forming the low-pressure phase BN powder was considerably small. The diameter t of the crystal grains obtained from a half band width of the diffraction line corresponding to the (002) plane of hBN through the above equations (A) to (C) was 8 nm.

A cBN sintered body was prepared from the low-pressure phase BN obtained in the aforementioned manner, similarly to Example 1. The structure of the obtained cBN sintered body was investigated by X-ray diffraction, to recognize that the ratio $I_{220}/I_{111}$ of diffraction intensity $I_{220}$ on the (220) plane of cBN relative to diffraction intensity $I_{111}$ on the (111) plane of cBN was 0.2, and the crystal grains forming the sintered body were isotropic. Further, this cBN sintered body exhibited a crystal grain diameter, hardness, heat conductivity and temperature resistance which were similar to those in Example 1, and attained a result similar to that in Example 1 in an intermittent high-speed cutting test for cast iron.

EXAMPLE 3

While the mixture of boron oxide and melamine was heat-treated in the tube furnace at the temperature of 950° C. for two hours in nitrogen gas in Example 1, a mixture of boron oxide and melamine was heat-treated in a tube furnace at a temperature of 1050° C. for two hours in nitrogen gas in Example 3. The remaining steps were similar to those of Example 1. The oxygen content of a low-pressure phase BN powder obtained in this manner, measured by gas analysis, was 0.2 percent by weight. When the crystal structure of the obtained low-pressure phase BN powder was investigated by X-ray diffraction, no diffraction line or peak was obtained from the (102) plane of hBN but a diffraction line corresponding to the (002) plane of hBN was broad in the X-ray diffraction diagram, with low crystallinity. A diameter t of the crystal grains of about 35 nm was obtained from a half band width of the diffraction line corresponding to the (002) plane of hBN, the angle causing the diffraction and the wavelength of the X-ray. The crystal structure of the low-pressure phase BN powder was observed with a scanning electron microscope, to recognize that the crystal grain diameter was 1 pm and the powder consisted of fine crystals.

A cBN sintered body was prepared from this low-pressure phase BN, similarly to Example 1. The crystal structure of the obtained cBN sintered body was investigated by X-ray diffraction, to recognize that the ratio $I_{220}/I_{111}$ of diffraction intensity $I_{220}$ on the (220) plane of cBN relative to diffraction intensity $I_{111}$ on the (111) plane of cBN was 0.12, and the crystals forming this cBN sintered body were isotropic. Further, this cBN sintered body exhibited hardness, heat conductivity, temperature resistance and a crystal grain diameter which were similar to those in Example 1, and attained a result similar to that in Example 1 in an intermittent high-speed cutting test for cast iron.

EXAMPLE 4

While the compact of low-pressure phase BN was introduced into the molybdenum capsule and kept at the pressure of 6.5 GPa and the temperature of 1850° C. for 15 minutes in the belt type superhigh pressure generator in Example 2, a compact consisting of low-pressure phase BN prepared similarly to Example 2 was introduced into a molybdenum capsule and kept at a pressure of 6 GPa and a temperature of 1550° C. in a belt type superhigh pressure generator in Example 4. A cBN sintered body was prepared by carrying out remaining processes which were similar to those in Example 2.

The characteristics and cutting performance of the cBN sintered body obtained in this manner were similar to those of the sintered body obtained in Example 2.

COMPARATIVE EXAMPLE 1

A commercially available compact of hBN was employed as a raw material. The grain diameter of this hBN compact was 3 to 10 μm. This compact was introduced into a high-frequency furnace and heat-treated at a temperature of 2100° C. for two hours in nitrogen gas, to obtain a sample. The oxygen content of this sample measured by gas analysis was 0.03 percent by weight. The sample was introduced into a molybdenum capsule similarly to Example 1, and kept at a pressure of 6.5 GPa and a temperature of 1850° C. for 15 minutes in a belt type superhigh pressure generator. The substance obtained in this manner was investigated, to recognize that the same was hardly sintered. The cBN content in this substance investigated by X-ray diffraction was about 10 percent by volume, and the remaining part of about 90 percent by volume was still hBN.

COMPARATIVE EXAMPLE 2

A commercially available compact of pBN was employed as a raw material. This compact was heat-treated in a high-frequency furnace at a temperature of 2100° C. for two hours in nitrogen gas, to obtain a sample. The oxygen content of this sample measured by gas analysis was 0.02 percent by weight. The sample was introduced into a molybdenum capsule similarly to Example 1, and kept at a pressure of 6.5 GPa and a temperature of 1850° C. for 15 minutes in a belt type superhigh pressure generator, the substance obtained in this manner was investigated, to recognize that the same was hardly sintered. The cBN content in this substance investigated by X-ray diffraction was about 90 percent by volume, while the remaining part of about 101 percent by volume consisted of compressed hBN.

COMPARATIVE EXAMPLE 3

A commercially available compact of hBN was employed as a raw material, The grain diameter of this hBN compact was 3 to 10 $\mu$m. This compact was heat-treated in a high-frequency furnace at a temperature of 2100° C. for two hours in nitrogen gas, to obtain a sample. The oxygen content of this sample measured by gas analysis was 0.03 percent by weight. The sample was introduced into a molybdenum capsule, and kept at a pressure of 7.7 GPa and a temperature of 2200° C. for 15 minutes in a belt type superhigh pressure generator, to obtain a strong cBN sintered body.

The structure of this cBN sintered body was investigated by X-ray diffraction, to recognize that the ratio $I_{220}/I_{111}$ of diffraction intensity $I_{220}$ on the (220) plane of cBN relative to diffraction intensity $I_{111}$ on the (111) plane of cBN was 0.06, and an anisotropic cBN sintered body selectively oriented in the <111> direction was obtained. It was also recognized that compressed hBN was present around a spacing d of 3.1 Å, although the amount thereof was small. The hardness of this cBN sintered body measured by a micro-Knoop indenter was 5000 kg/mm². The heat conductivity of this cBN sintered body measured by a laser-flash method was about 5.5 W/cm·° C. A cutting tool was prepared from this cBN sintered body, and subjected to an intermittent high-speed cutting test for cutting cast iron similarly to Example 1. Although this comparative sample cutting tool exhibited a life of about twice that of a tool consisting of a commercially available cBN sintered body, this cutting tool suffered such serious chipping that its cutting edge was conceivably separated in layers.

COMPARATIVE EXAMPLE 4

A commercially available compact of pBN was employed as a raw -material. This compact was heat-treated in a high-frequency furnace at a temperature of 2100° C. for two hours in nitrogen gas, to obtain a sample. The oxygen content of this sample measured by gas analysis was 0.02 percent by weight. The sample was introduced into a molybdenum capsule, and kept at a pressure of 7.5 GPa and a temperature of 2100° C. for 15 minutes in a belt type superhigh pressure generator, to obtain a strong cBN sintered body. The structure of this cBN sintered body was investigated by X-ray diffraction, to recognize that a diffraction line from the (220) plane of cBN was hardly observed and the ratio $I_{220}/I_{111}$ of diffraction intensity $I_{220}$ on the (220) plane of cBN to diffraction intensity $I_{111}$ on the (111) plane of cBN was substantially zero. Thus, it was recognized that this cBN sintered body was selectively oriented in the <111> direction and had extremely strong anisotropy. It was also recognized that compressed hBN was present around a spacing d of 3.1 Å through the x-ray diffraction. The hardness of this cBN sintered body was 4000 kg/mm². Further, the heat conductivity of this sintered body measured by a laser flash method was about 4.5 W/cm·° C. When a cutting tool was prepared from this cBN sintered body and subjected to an intermittent high-speed cutting test for cutting cast iron, its cutting edge was instantaneously chipped. The damaged cutting edge exhibited a number of parts separated in layers.

COMPARATIVE EXAMPLE 5

$B_2O_3$ was reacted with ammonia to synthesize low-crystalline low-pressure phase BN for serving as a raw material. The diameter of crystal grains forming this raw material was 0.5 $\mu$m. The composition of this raw material was analyzed, to recognize that it contained about 3 percent by weight of $B_2O_3$. The raw material was heat-treated in a high-frequency furnace at a temperature of 2100° C. for two hours in nitrogen gas, for removing this $B_2O_3$. The oxygen content was reduced to about 0.1 percent by weight due to the heat treatment, while crystal grains of hBN were grown into a diameter of 3 to 5 $\mu$m. While preparation of a cBN sintered body from the raw material was attempted similarly to Example 1, the hBN was not converted to cBN and no strong cBN sintered body was obtained at all.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of preparing a cubic boron nitride sintered body comprising the steps of:

a) preparing a low-pressure phase boron nitride starting material by reducing a first compound containing boron and oxygen with a second compound containing carbon and nitrogen; and b) directly convertin said low-pressure phase boron nitride starting material to cubic boron nitride under a high temperature and high pressure condition adequate for converting low-pressure phase boron nitride to cubic boron nitride, and simultaneously performing sintering to form said cubic boron nitride sintered body;

wherein said steps a) and b) are carried out in such a manner so that said cubic boron nitride sintered body has a crystal characteristic exhibiting a first X-ray diffraction intensity ($I_{220}$) on a (220) crystal plane and a second x-ray diffraction intensity ($I_{111}$) on a (111) crystal plane, with a ratio ($I_{220}/I_{111}$) of said first intensity ($I_{220}$) relative to said second intensity ($I_{111}$) being at least 0.1.

2. The method of preparing a cubic boron nitride sintered body in accordance with claim 1, wherein said starting material contains low-pressure phase boron nitride and 0.08 to 1 percent by weight of oxygen.

3. The method of preparing a cubic boron nitride sintered body in accordance with claim 2, wherein said step a) is carried out in such a manner that said low-pressure phase boron nitride starting material contains at least 0.2 percent by weight of oxygen.

4. The method of preparing a cubic boron nitride sintered body in accordance with claim 1, wherein said step a) is carried out to prepare said starting material as a powder, and further comprising heating said powder in a non-oxidative atmosphere, thereafter forming said powder to obtain a compact, and further heating said compact before carrying out said step b) with said compact as said starting material.

5. The method of preparing a cubic boron nitride sintered body in accordance with claim 4, wherein said heating of said powder in said non-oxidative atmosphere is carried out at a temperature of at least 2100° C., and said heating of said compact is carried out at a temperature of at least 2100° C.

6. The method of preparing a cubic boron nitride sintered body in accordance with claim 1, wherein sand first compound comprises boron oxide, and said second compound comprises melamine.

7. The method of preparing a cubic boron nitride sintered body in accordance with claim 6, wherein said reducing comprises reacting said boron oxide and said melamine with each other at a temperature in a range from 850° C. to 1050° C. in a nitrogen gas atmosphere, and further comprising washing unreacted boron oxide out of said starting material using ethanol before said step b).

8. The method of preparing a cubic boron nitride sintered body in accordance with claim 1, further comprising, before said step b), an additional step of heating said low-pressure phase boron nitride starting material in a non-oxidative atmosphere at a temperature of at least the boiling point of said first compound containing boron and oxygen.

9. The method of preparing a cubic boron nitride sintered body in accordance with claim 1, wherein said steps a) and b) are carried out in such a manner so that said ratio is at least 0.18.

10. The method of preparing a cubic boron nitride sintered body in accordance with claim 1, carried out using no catalyst during said converting and said sintering.

11. The method of preparing a cubic boron nitride sintered body in accordance with claim 1, wherein said high temperature and high pressure condition comprises a temperature of at least 1550° C. and a pressure of at least 6 GPa.

12. The method of preparing a cubic boron nitride sintered body in accordance with claim 1, wherein said high temperature and high pressure condition comprises a temperature of at least 1850° C. and a pressure of at least 6.5 GPa.

13. The method of preparing a cubic boron nitride sintered body in accordance with claim 1, wherein said starting material is prepared in the form of a powder having an average grain size of 8 nm to 35 nm in said step a).

14. The method at preparing a cubic boron nitride sintered body in accordance with claim 1, wherein said high temperature and high pressure condition of said step (b) comprises a pressure not greater than 6.5 GPa.

15. The method of preparing a cubic boron nitride sintered body in accordance with claim 1, wherein said high temperature and high pressure condition of said step (b) comprises a pressure not greater than 7.7 GPa.

16. The method of preparing a cubic boron nitride sintered body in accordance with claim 1, wherein said high temperature and high pressure condition of said step (b) comprises a pressure less than 10 GPa.

17. A cubic boron nitride sintered body prepared by directly converting to cubic boron nitride, and simultaneously sintering, a low-pressure phase boron nitride starting material under a high temperature and high pressure condition adequate for converting low-pressure phase boron nitride to cubic boron nitride, wherein said sintered body has a crystal characteristic exhibiting a first X-ray diffraction intensity ($I_{220}$) on a (220) crystal plane and a second X-ray diffraction intensity ($I_{111}$) on a (111) crystal plane, with a ratio ($I_{220}/I_{111}$) of said first intensity ($I_{220}$) relative to said second intensity ($I_{111}$) being at least 0.1.

18. The cubic boron nitride sintered body in accordance with claim 17, wherein said cubic boron nitride sintered body is formed of cubic boron nitride crystals having a train diameter of not more than 1 $\mu$m.

19. The cubic boron nitride sintered body in accordance with claim 18, wherein said grain diameter is not more than 0.5 $\mu$m.

20. The cubic boron nitride sintered body in accordance with claim 17, having a hardness of at least 4500 kg/mm$^2$.

21. The cubic boron nitride sintered body in accordance with claim 20, wherein said hardness is at least 5500 kg/mm$^2$.

22. The cubic boron nitride sintered body in accordance with claim 17, having a temperature-resistance up to a temperature of at least 1200° C. in a non-oxidative atmosphere.

23. The cubic boron nitride sintered body in accordance with claim 8, wherein said temperature is at least 1350° C.

24. The cubic boron nitride sintered body in accordance with claim 17, wherein said sintered body contains no remaining hexagonal boron nitride and contains no impurity between crystal grains of said cubic boron nitride.

25. The cubic boron nitride sintered body in accordance with claim 17, wherein said sintered body consists essentially of said cubic boron nitride and has an isotropic crystal characteristic.

26. The cubic boron nitride sintered body in accordance with claim 17, wherein said ratio ($I_{220}/I_{111}$) is at least 0.18.

27. The cubic boron nitride sintered body in accordance with claim 17, having a heat conductivity of at least 6 W/cm·° C.

* * * * *

UNITED STATES PATENT AND TRADEMARK OFFICE
CERTIFICATE OF CORRECTION

PATENT NO. : 6,071,841          Page 1 of 3

DATED : June 6, 2000

INVENTOR(S) : Sumiya

It is certified that error appears in the above-identified patent and that said Letters Patent is hereby corrected as shown below:

Title Page:    following the ABSTRACT, after "27 Claims,", replace "No Drawings" by --1 Drawing Sheet--;

Please insert the following drawing Figure:

FIG. 1

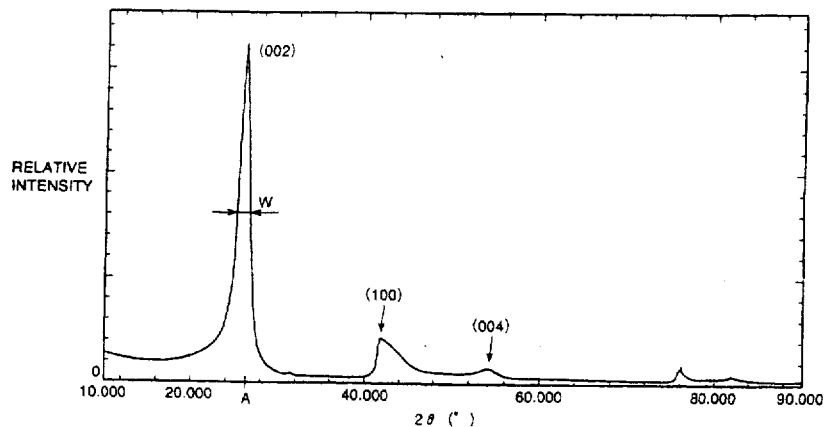

UNITED STATES PATENT AND TRADEMARK OFFICE
CERTIFICATE OF CORRECTION

PATENT NO. : 6,071,841
DATED : June 6, 2000
INVENTOR(S) : Sumiya

It is certified that error appears in the above-identified patent and that said Letters Patent is hereby corrected as shown below:

| | | |
|---|---|---|
| Col. 1, | line 48, | after "the", replace "stlme" by --same--; |
| | line 54, | after "a", replace "suparhigh" by --superhigh--; |
| Col. 2, | line 2, | after "separation", replace "1a" by --is--; |
| | line 50, | after "rhombohedral", replace "SN" by --BN--; |
| Col. 3, | line 30, | after "after", replace "a heating" by --heating a--; |
| Col. 4, | line 6, | (actual line count), after "for", replace "the preparing" by --preparing the--; |
| | line 27, | after "was", delete "prepared"; |
| | line 37, | after "width", replace "w" by --W--; |
| | line 38, | after "to", replace "Obtain", by --obtain--; |
| | line 45, | after "width", replace "SM" by --BM--; |
| | line 51, | after "true", replace "halt" by --half--; |
| Col. 5, | line 17, | before "crystal", replace "caN" by --cBN--; |
| Col. 6, | line 32, | after "1", replace "pm" by --µm--; |

UNITED STATES PATENT AND TRADEMARK OFFICE
CERTIFICATE OF CORRECTION

PATENT NO. : 6,071,841
DATED : June 6, 2000
INVENTOR(S) : Sumiya

It is certified that error appears in the above-identified patent and that said Letters Patent is hereby corrected as shown below:

Col. 7, line 27, after "about", replace "101" by --10--;

Col. 8, line 9, after "cBN", insert --relative--;
line 52, after "directly", replace "convertin" by --converting--;

Col. 9, line 21, after "wherein", replace "sand" by --said--;

Signed and Sealed this

Twenty-fourth Day of April, 2001

Attest:

NICHOLAS P. GODICI

Attesting Officer     Acting Director of the United States Patent and Trademark Office